United States Patent
Dooley

(10) Patent No.: US 12,377,450 B2
(45) Date of Patent: Aug. 5, 2025

(54) FLEXIBLE TRAY OR MAT WITH UNIVERSAL APPLICATION

(71) Applicant: Lucy J Dooley, Fort Smith, AR (US)

(72) Inventor: Lucy J Dooley, Fort Smith, AR (US)

(73) Assignee: Lucy J. Dooley, Ft. Smith, AR (US)

( * ) Notice: Subject to any disclaimer, the term of this patent is extended or adjusted under 35 U.S.C. 154(b) by 0 days.

(21) Appl. No.: 17/172,181

(22) Filed: Feb. 10, 2021

(65) Prior Publication Data
US 2022/0250125 A1    Aug. 11, 2022

Related U.S. Application Data

(60) Provisional application No. 62/972,556, filed on Feb. 10, 2020.

(51) Int. Cl.
| | | |
|---|---|---|
| *B08B 13/00* | (2006.01) | |
| *B08B 17/02* | (2006.01) | |
| *B08B 17/04* | (2006.01) | |

(52) U.S. Cl.
CPC ............ *B08B 17/025* (2013.01); *B08B 17/04* (2013.01)

(58) Field of Classification Search
CPC .. A01K 1/0107; A01K 1/0157; B08B 17/025; B08B 17/04; F16N 31/006; F25D 21/14; A47G 19/02; A47G 113/52; B65D 1/36; B65D 90/046; B65D 2213/00; B65D 2215/00; B65D 2501/00; B65D 2313/00
See application file for complete search history.

(56) References Cited

U.S. PATENT DOCUMENTS

| | | | | |
|---|---|---|---|---|
| 5,620,546 A | * | 4/1997 | Reuben | B29C 43/18 |
| | | | | 264/293 |
| 7,867,599 B1 | * | 1/2011 | Willingham | B25H 5/00 |
| | | | | 280/32.6 |
| 2010/0003448 A1 | * | 1/2010 | Duce | A47G 23/03 |
| | | | | 428/83 |
| 2021/0214125 A1 | * | 7/2021 | Fancher | C11C 5/004 |

FOREIGN PATENT DOCUMENTS

KR    2019046028 A  *  5/2019  ............ A47G 19/02

OTHER PUBLICATIONS https://www.amazon.com/Silicone-Placemats-Non-Slip-Toddlers-Childrens/dp/B08784PVCW/ref=cm_cr_arp_d_product_top?ie=UTF8 (Year: 2019).*
https://www.amazon.com/Silicone-Placemats-Non-Slip-Toddlers-Childrens/product-reviews/B08784PVCW/ref=cm_cr_arp_d_paging_btm_next_17?ie=UTF8&reviewerType=all_reviews&pageNumber=17&sortBy=recent (Year: 2019).*
KR-2019046028-A English Abstract Translation (Year: 2019).*

* cited by examiner

*Primary Examiner* — Eric W Golightly

(57) ABSTRACT

A conventional utility tray or mat I typically a solid object of hard plastic or metal. The present invention is a flexible tray or mat object, permitting the tray or mat to be form fitted to the enclosure or container, and removed by being folded or rolled up, so as to enable effortless removal of the mat or tray, while continuing to contain any objects or fluids that were within or on the tray or mat. Additionally, even when placed on a non enclosed solid surface, the flexible character of the invention allows it to be folded or rolled up and removed, while continuing to contain any objects or fluids that were within or on the tray or mat.

1 Claim, 3 Drawing Sheets

FLEXIBLE TRAY OR MAT WITH UNIVERSAL APPLICATION

PRIOR PROVISIONAL PATENT NUMBER

EFS ID 38546431; Application Ser. No. 62/972,559; filed Feb. 10, 2020, incorporated herein by reference in its entirety.

BACKGROUND OF THE INVENTION

An ordinary utility tray or mat is rigid and inflexible, and can only be fitted to enclosures or containers of corresponding size, or with an entry large enough to accommodate the tray or mat. Further, the rigidity likewise makes removal of the tray or mat from its corresponding enclosure or container problematic, and creates heightened risk of dislodging any contents contained within the perimeter of the tray or mat. A need exists for a flexible tray or mat, that can be rolled or folded for entry and egress, and form fitted to an enclosure or container, that will eliminate these vexing problems. The advantages of a flexible mat or tray are not lost even when being used on a flat surface, such as a table top.

BRIEF DESCRIPTION OF THE DRAWING

Attached as FIG. 1 is a pre production drawing of an possible exemplar of such a mat. This drawing is an example only, as a finished product can be a circle, square, rectangle, oval, or any other shape that may be necessary or desirable. The invention has a flat surface on the interior, and side edges, or walls, which can be vertical or angular, as depicted, and of any desired height and width, around the perimeter of the mat enclosing all four sides of the interior, and having an embedded cylinder (hole) for attaching the invention to a fixed object. This prevents items on the mat from falling, rolling off, getting lost, and most importantly, when rolled or folded up, contains the contents of the mat or tray when it is being removed from a container or enclosure and also prevents leakage of any fluid or viscous contents contained within the tray or mat.

SPECIFICATION AND DETAILED DESCRIPTION OF THE INVENTION

Figure 1:
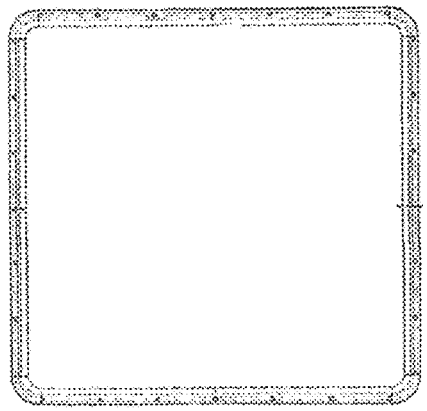
Figure 2:
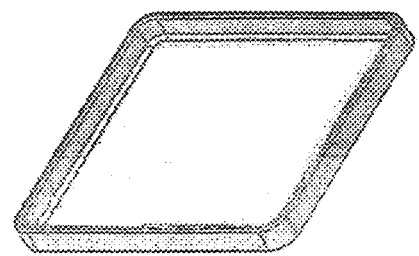
Figure 3:
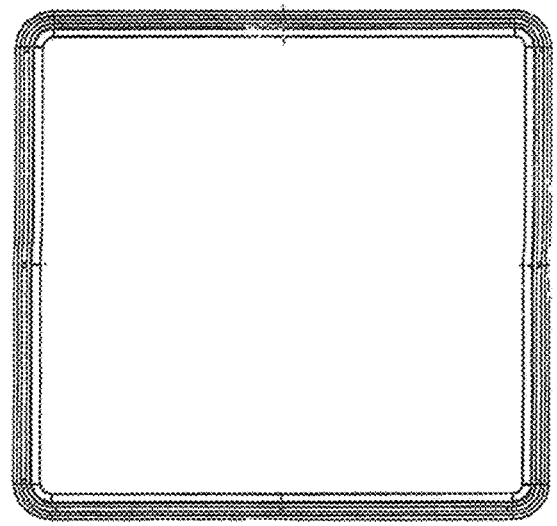
Figure 4:
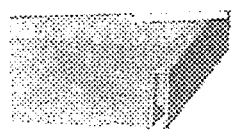
Figure 5:
Figure 6:
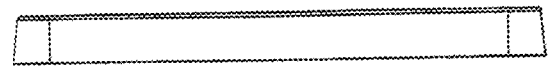
Figure 7:
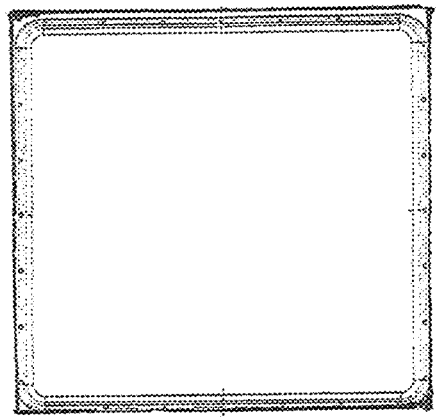
Figure 8:
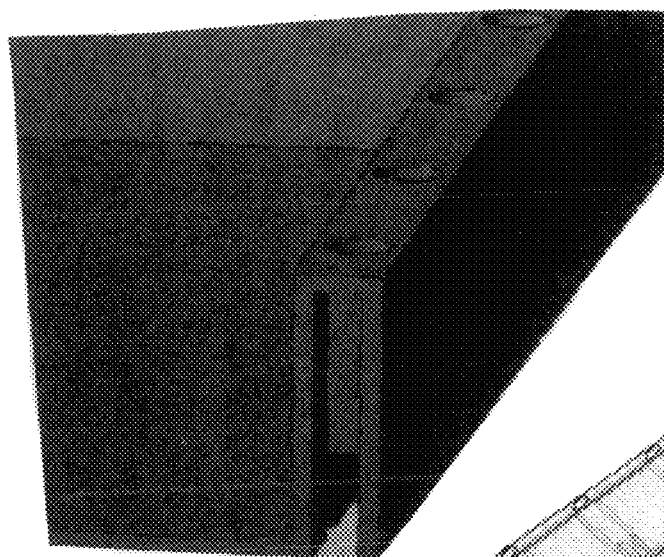
Figure 9:
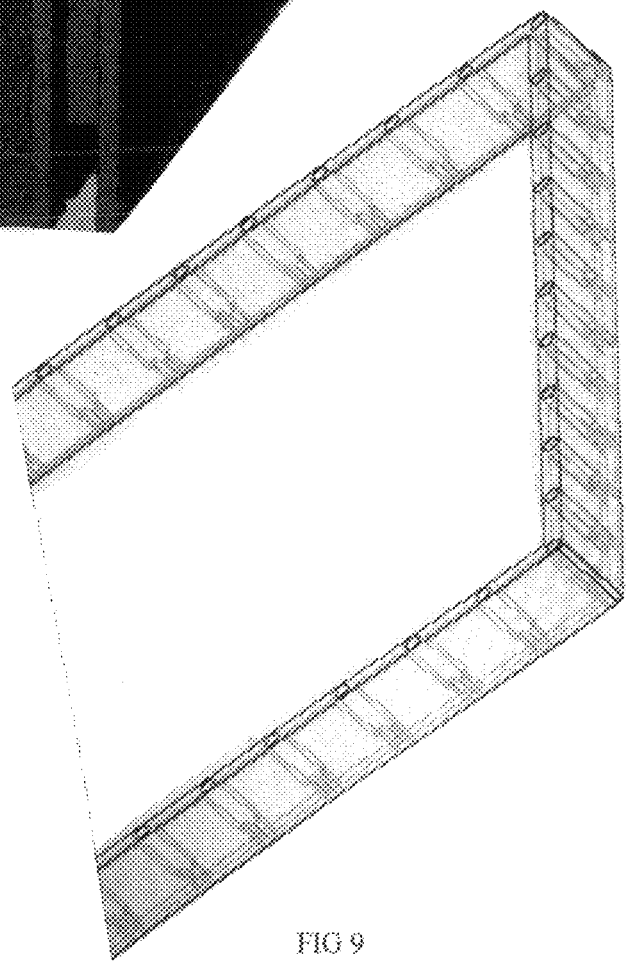

The invention has a flat surface comprising its interior, and side edges, or walls, which can be vertical or angular, and of any desired height and width, around the perimeter of the mat, thus enclosing all four sides of the interior, as depicted on the examplar drawing. The tray or mat sizing and structure composition can change depending on size requirements, need for structural support of the side wall, and thickness of the mat materials used. The inside base of the mat is flat to lay against the surface it is to protect.

The most important aspect of the instant invention, and which sets it apart from previous inventions, is that the composition of this invention is from a food grade (if required), or non food grade, non rigid, silicone rubber or other pliable product, with structure, dimensions, and mobility to conform to the needs the tray or mat was intended for—be it laying on a flat surface as a protectant, or conforming to an enclosure or container. The unique flexibility of the mat allows it to be conformed to enclosures or containers of a different dimension than the mat, and allow it to pass through entry and egress apertures smaller than the dimensions of the invention, a feat impossible for prior inventions. In such a use, the sides of the mat or tray would be pulled toward the center, using the side walls to retain and hold debris, then the mat or tray is removed or extracted from the opening. An example of where the characteristics of this invention will be particularly useful are extractions from the door of animal cages, pet taxis, crates, and any place that the mat is used which is required to be cleaned regularly. The unique characteristics of the invention make daily clean up or sterilization quick and easy.

The invention can be manufactured by injection molding in the usual manner from a model, or by 3D printing. The side walls of the invention may contain spaced holes on all sides as desired and depicted in the drawing to allow for affixing the mat or tray to a surface or enclosure or container, such as by threading a cord, twine, zip tie, or similar, or for attaching other fasteners to hold the invention in place, such as velcro, snaps, grommets, magnets, nuts and bolts, screws and nuts, eyelets . . . anything used to secure or clamp the invention in a stable position. The aforesaid holes are functionally described as a hollow, vertical, cylinder of varying dimension as required, and may be created in the mold during manufacture, or by the end user as needed after manufacture.

The silicone or pliable material makes it possible to manufacture the invention in a wide variety of colors or patterns including, but not limited to, bright primary colors such as red, blue, yellow, orange, purple, green, pink, teal pastels, tan, brown, black or white, or any designs like tie-dyed, designs, prints, or any other combinations created.

The invention is mobile, lightweight, and can be transported easily. The invention may be used any place where multiple pieces of any size, that fit within the dimensions of the mat, such as small components, parts, pieces, supplies, need to be contained from loss or misplacement, or the need to contain fluid leakage The invention can be used as a buffer/barrier, or an external preventative measure used to protect surfaces below the mat. Examples of items the invention can be used to protect are table tops, shelves, flooring, carpet, bed, car, or any place a surface could get damaged from spills, liquids, food, pet dander, pet weight, or continuous use in a space needing protection from an external source that can abrade, burn, scratch, or otherwise damage it. The invention when used for this purpose is acting as a buffer and barrier while containing whatever is placed within the confines of the mat, simultaneously offering protection to the surfaces below it, and securing items within the mat The invention can be easily cleaned; its non rigid structure allowing it to be cleaned in sinks and containers smaller than the invention, with warm soap, water, or a water soluble sterilizing product.

Examples of potential users of the invention include, but are not limited to, artists, architects, barbers, beauticians, camping, children, crafter's, drafters, hobbyists, electronic manufacturing and repair, fishing, hobbyists, horticulture, hunting, kitchen, mechanics, medical, pet beds, pet crates, pet taxis, pet shops, picnics, doctors, dentists, veterinarians, kennels, pet shops.

Pets: aquarium mat (under aquarium, protect tables, cabinets, furniture, from spills); bird cage mat, likewise and can contain loose seeds and feathers; cat litter box mat collects loose litter as cats leave box; cat/dog: pet cage/crate/taxi/bed/pillow/food & water bowls.

Children: high chair floor mat, finger painting, painting, coloring and drawing, play dough, modeling clay, chalk, flash cards, coin counting, games, puzzles, Lego, erector sets, marbles, papier mache', models, tinker toys, Lincoln Logs, toys with many pieces, crafts and art, where it is useful for small objects to be contained, fluids need to be contained, and surfaces protected. Kitchens and Households: cutting boards and food preparation trays can be placed within the mat to contain fluids and food crumbs and debris. Additional uses for the mat or tray could be drawer liners, cabinets, pantries, under sinks, refrigerator drawer/shelf liners, under floor mat for wet or dirty shoes or boots, under laundry carts.

OTHER USERS: Artists, barber shops, beauticians, bicycle repair, boating, car/trunk bed mat for plant or gardening debris, computer builders, cosmetics, crafter's, electronics, engineers, florists, hobbies, horticulture/planting/kitchen, laundry carts, wet clothes, marine, mechanics, medical, pharmaceutical, tailgating, floor mat holders (protecting floors from dirty shoes or boots), trunk or back car bed liners to protect spill containment, hauling dirt, sports equipment.

I claim:

1. A one piece utility mat comprising: an upward vertical exterior side wall surround by a continuous horizontal top edge, containing vertical holes within the edge, interior downward vertical wall defining a seamless recessed reservoir base, a proximal wall, a distal wall opposite the proximal wall, a left lateral wall, a right lateral wall, said left lateral wall and right lateral wall are connected to the distal wall, opposite the proximal wall, the left lateral wall, and right lateral wall said connected to the proximal wall, an exterior edge of an inverted underside of said mat contains a continuous channel consisting of a void containing vertical holes connected to an external horizontal edge of a top side of mat containing the reservoir.

* * * * *